United States Patent
Brown

[11] Patent Number: 5,615,516
[45] Date of Patent: Apr. 1, 1997

[54] WATERING DEVICE

[76] Inventor: William V. Brown, 6410 Forestshire, Dallas, Tex. 75230

[21] Appl. No.: 494,593

[22] Filed: Jun. 23, 1995

[51] Int. Cl.[6] ..................................... A47G 7/02
[52] U.S. Cl. ............................. 47/40.5; 428/11
[58] Field of Search ................. 47/40.5; 428/7, 428/11

[56] References Cited

U.S. PATENT DOCUMENTS

| | | | |
|---|---|---|---|
| 4,850,137 | 7/1989 | Foster | 47/40.5 |
| 5,327,677 | 7/1994 | Rivera | 47/40.5 |
| 5,369,910 | 12/1994 | Copenhaver | 47/40.5 |
| 5,473,838 | 12/1995 | Denbigh | 47/40.5 |

*Primary Examiner*—Henry E. Raduazo
*Attorney, Agent, or Firm*—L. Dan Tucker

[57] ABSTRACT

A watering device (10) for use with a cut tree (2) in a base. The waterer (10) can be shaped to resemble an ornament. The waterer has a an inlet (22) and an outlet (28). A flexible tube (30) is attached to the outlet. Thus, water poured into the inlet exits through the outlet and into the tube. The tube, typically hidden within the tree, can extend downward and into a base or reservoir. Therefore, the water can exit the tube and into the base.

12 Claims, 1 Drawing Sheet

U.S. Patent
Apr. 1, 1997
5,615,516
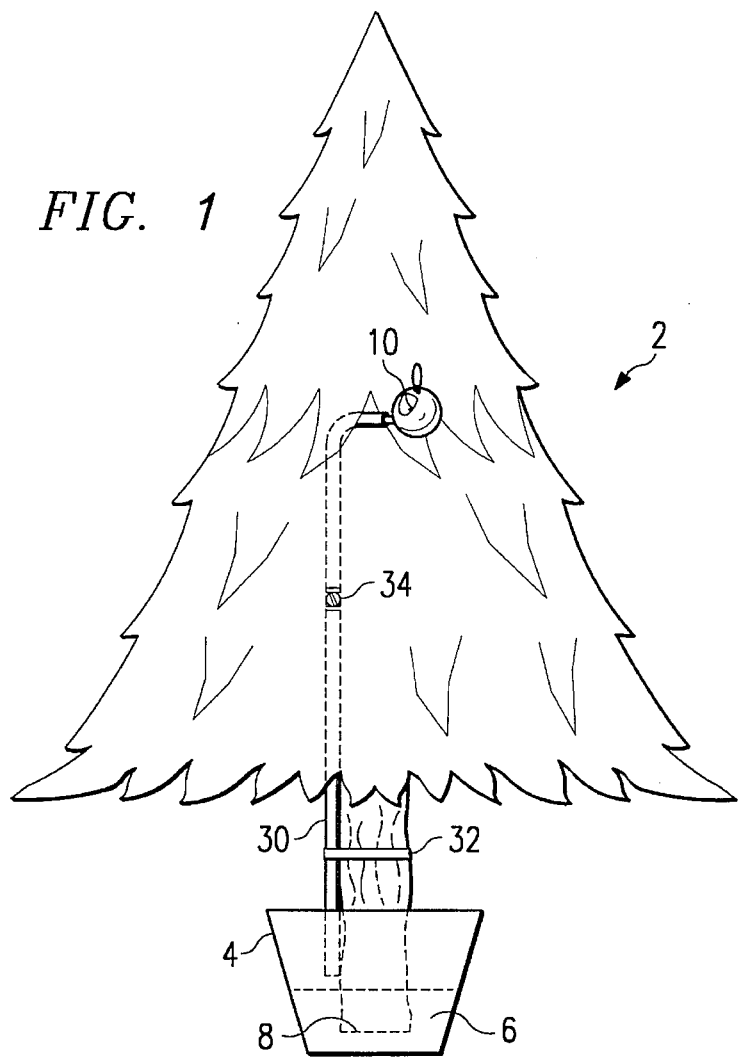
FIG. 1
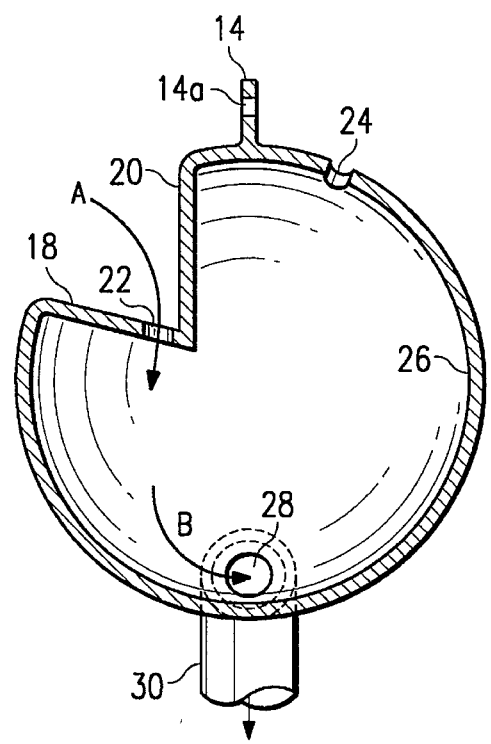
FIG. 2
FIG. 3

WATERING DEVICE

TECHNICAL FIELD OF THE INVENTION

The present invention relates to a watering device. Specifically, the watering device can be used on a cut tree anchored in a base having a water reservoir. The device provides a container hung on the tree with a passage which can accept and carry water to the reservoir.

BACKGROUND OF THE INVENTION

Christmas trees have been a tradition in the United States for hundreds of years. Most families raise and decorate either a real tree or an artificial tree. Artificial trees offer convenience. Unfortunately, artificial trees have never been lifelike enough to fool the eye or nose. Therefore, most prefer to buy a cut variety of pine tree, such as the Douglas fir. The cost of a cut tree can range from less than twenty dollars to several hundred dollars. The cut tree is then placed into a stable base. The base can have several legs which minimize the risk of the tree falling over. Likewise, the base forms a reservoir for holding a volume of water which is absorbed by the tree. A cut tree will ultimately perish. However, families want the tree to stay vital through the holidays. Therefore, it is important to maintain a suitable amount of water in the reservoir.

Failure to maintain water in the reservoir will result in the early demise of the tree. As the tree dries out, it will harden and its needles will easily detach and fall to the floor. Also, as the tree deteriorates, its branches will droop under the weight of any ornaments, causing many to fall to the ground. Besides its loss of appeal, a dry tree is clearly a fire hazard of great danger. Christmas trees are typically laden with strings of electric lights. These lights usually have been twisted and stored for eleven months before their use. A break in the insulation around the wiring, an exploding bulb, or even the buildup of heat can cause the fire dry tree to erupt in flames. Therefore, it is imperative to keep the reservoir full and the tree as moist as possible.

Filling a tree's reservoir is difficult. The circumference of the reservoir is usually very small when compared to that of the base of the tree. Therefore, the user must stoop and reach well under the tree to reach the reservoir. Cut pine trees also have the tendency of producing sap. This sap can easily smear onto clothing. Reaching under the tree to fill the reservoir also subjects the waterer to scratches and abrasions from the limbs and needles of the tree. Therefore, a need exists for an apparatus and method for watering a cut tree. The apparatus must be inconspicuous and yet effective. It should be easily secured to the tree, and must be dependable.

SUMMARY OF THE INVENTION

The present invention relates to a watering device for trees. The invention is particularly suitable for use on a cut Christmas tree; however, it can be used on any plant whether cut, planted or potted. The waterer involves a container with an inlet and an outlet. The container can be shaped like an ornament. A flexible tube is attached to the outlet and laced inside the tree and inconspicuously down its trunk.

In use, the hollow ornament is hung on the tree at a convenient height. The user could then replenish the water in the base by merely pouring water into the inlet of the ornament. The water flows out of the outlet of the ornament and into the tube. The tube should extend downward from the ornament to the base. Therefore, the water will then flow down the tube and into the base. In one embodiment of the watering device, at least one strap is used to secure the flexible tubing to the tree. This helps avoid the case of the tubing falling away from the base, allowing water to empty onto the floor. In another embodiment, a valve is interposed in the flow path of the water, allowing the user to control the rate at which water is added to the base. It is important to note that the waterer can be used on any plant, and not just exclusively trees. Moreover, the waterer can be used on plants in stands, pots or in the ground.

BRIEF DESCRIPTION OF THE DRAWINGS

For a more complete understanding of the present invention, and for further details and advantages thereof, reference is now made to the following Detailed Description taken in conjunction with the accompanying drawings, in which:

FIG. 1 is a perspective view of the watering device attached to a tree; and

FIG. 2 is a perspective view of waterer showing the inlet; and

FIG. 3 is a sectional view across line 3—3 in FIG. 2.

DETAILED DESCRIPTION OF THE DRAWINGS

FIGS. 1 to 3 illustrate a watering device 10, or waterer, which embodies the present invention. The waterer 10 is shown on a cut tree 2 in a stand 4. A reservoir 6 of water is available in the stand. The cut base 8 of the tree 2 is submerged in the reservoir 2 of water and can absorb the water through its cut base. However, the reservoir can run dry through evaporation and absorption. The waterer 10 allows its user to conveniently replenish the water in the reservoir.

The waterer 10 includes a hollow container 12 having an inlet 22 and an outlet 28. In one embodiment, the container is generally spherical. The outer surface of the container can be ornamented to blend in with other ornaments on a Christmas tree. The inner surface 26 is generally spherical as well. In use, the container is attached to the tree 2 by a loop 16 or other suitable connector. The loop 16 is attached to flange 14 through hole 14a. The loop 16 is then placed around a branch of tree 2. The container can be hung at any suitable height on the tree to facilitate the pouring of water into the container. The tube is laced into the tree and down to the base. Water can then be poured into the container where it then flows down the tube and into the base.

A fluid channeling surface 18 is configured to guide poured water into the inlet 22. Referring to FIG. 3, the channeling surface 18 is generally slanted with the inlet at its lowest point. The channeling surface 18 works in conjunction with a back splash 20. Water enters the hollow interior of container 2 as shown by arrow A. Based on the rate of water ingress, water can accumulate inside the container. Likewise, water exits the container through outlet 28 as shown by arrow B. The outlet 28 is preferably located at the lowest point in the container. The water flows into a tube 30 which directs the water into the reservoir. The container can be hung to allow the tube to inconspicuously follow the trunk of the tree. The tube can be precut a suitable length, and even shortened to meet the needs of the user. The tube is typically flexible and can be coiled around the trunk. The tube can be clear so the user can watch the flow of water, or opaque. The tube can also be colored to match the trunk or foliage on the tree.

In another embodiment, a strap 32 can be attached to the tube to secure the tube to the trunk. The strap can be integral with the tube, having flexible tie ends. The strap could also use a hook and loop fastener to removably attach to the tube 30. The strap is preferably used to secure the tube near to the reservoir. In addition, a strap can be used to secure the tube to the trunk or suitable branch, near where the container is hung. This later arrangement minimizes the chance of the container being displaced by the shifting weight of water running through the tube. Of course, the tube should always extend downward from the ornament.

In yet another embodiment, a valve 34 can be interposed in the tube 30 to regulate the flow therethrough. For example, the user might fill the container and choose to release the water at a later time. The valve can be opened at that time. Alternatively, the valve could be opened slightly to allow the water to drip slightly. Also, to facilitate the flow of water into and out of the interior of container 10, a vent hole 24 is provided near the apex of the container. In another embodiment, a screen can be placed over outlet 28. In this embodiment, plant food can be placed into the inlet and allowed to dissolve and flow to the reservoir 6. The screen blocks the early exit of undissolved plant food. It should be reemphasized that the present invention can be used on any plant, whether potted, planted or cut.

Although preferred embodiments of the present invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the appended claims.

I claim:

1. A watering device for use on a tree comprising:

a hollow container shaped as a spherical ornament;

a funnel shaped fluid channeling surface in the upper portion of said hollow container extending downwardly to an inlet into the interior of said hollow container;

an outlet orifice in the lower portion of said hollow container, said outlet container being in fluid communication with a tube means attached to said outlet said tubular means extending to the base of a tree; and a vent hole extending through the wall of said hollow container at a point above the inlet into the interior of said hollow container.

2. The watering device of claim 1 wherein said tube means comprises a length of flexible tubing.

3. The watering device of claim 1 wherein said container further comprises a backsplash surface to direct the flow of liquid to the inlet.

4. The watering device of claim 1 further comprises attachment means suitable for securing the container to a tree.

5. The watering device of claim 1 wherein said attachment means comprises a loop secured through a flange on the container.

6. The watering device of claim 1 further comprises:

(c) a strap attached to the tube means, wherein said strap can be secured to the tree.

7. The watering device of claim 1 further comprises:

(c) a valve interposed with the tube to control a flow of liquid therethrough.

8. The watering device of claim 1 wherein the tube means is clear.

9. The watering device of claim 1 wherein the tube means is opaque.

10. The watering device of claim 1 wherein the tube means is colored to match the tree.

11. The watering device of claim 1 wherein said outlet is located at the lowest point of the container.

12. A method of watering a cut tree in a base which forms a reservoir, the method comprising:

(a) hanging a hollow container on the tree, said container having a funnel shaped channeling surface in an upper surface of said hollow container extending downwardly to form an inlet into said container, a vent hole extending through the surface of said hollow container, an outlet and a tube extending from the outlet to the base;

(b) pouring water into said funnel shaped channeling surface, causing air to vent through said vent hole as said water passes through the outlet, down the tube and into the base.

\* \* \* \* \*